E. F. W. ALEXANDERSON.
MOTOR CONTROL.
APPLICATION FILED AUG. 10, 1907.

957,454.

Patented May 10, 1910.

Witnesses
J. Earl Ryan
J. Ellis Glen

Inventor:
Ernst F. W. Alexanderson
by Albert G. Davis
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MOTOR CONTROL.

957,454.   Specification of Letters Patent.   Patented May 10, 1910.

Application filed August 10, 1907. Serial No. 388,001.

*To all whom it may concern:*

Be it known that I, ERNST F. W. ALEXANDERSON, a citizen of the United States, residing at Schenectady, county of Schenectady, State of New York, have invented certain new and useful Improvements in Motor Control, of which the following is a specification.

My invention relates to the control of alternating-current series motors, and its object is to improve the ampere speed characteristic of such motors. The torque and current of an alternating-current motor fall off less rapidly with increase of speed than in the direct-current motor, so that an alternating-current motor designed for the same starting torque as a direct-current motor tends to overload itself at high speeds.

My invention consists in a novel connection for such motors adapted to produce automatically a gradually increasing shunt excitation as the motor speeds up. This results in strengthening the motor field for high speeds, thereby reducing the speed for a given current and torque, and so preventing the motor from overloading itself at high speeds.

On a car or locomotive, where two or more motors are employed, a convenient way of obtaining an automatic gradual increase of the shunt excitation is to produce a phase-displacement between the voltages at the armature terminals of a pair of motors, and impressing on the motor fields a shunt voltage corresponding in amount to this phase-displacement. This phase-displacement increases with increase of speed, so that if a voltage proportional to the phase-displacement is employed for furnishing the shunt excitation, the gradual automatic increase of shunt excitation that is desired is obtained. This arrangement further provides a shunt voltage of the proper phase,—that is, nearly ninety degrees out of phase with the voltage at the motor terminals. This phase relation is requisite, because the shunt field current should be nearly in phase with the voltage impressed on the motor terminals, and necessarily lags nearly ninety degrees behind the shunt voltage that produces it, as the field winding is highly inductive.

My invention will best be understood by reference to the accompanying drawings, in which—

Figure 1:
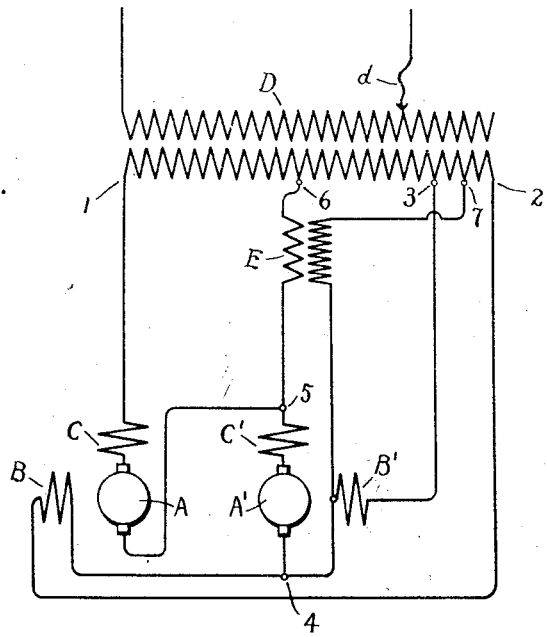
Figure 2:
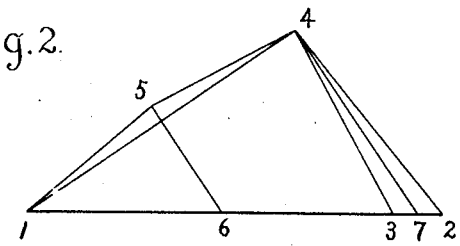
Figure 3:
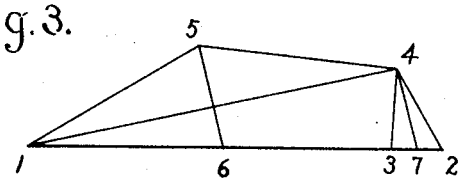

Figure 1 shows diagrammatically a pair of motors arranged and connected in accordance with my invention; and Figs. 2 and 3 are explanatory diagrams.

In Fig. 1, A A' represent the armatures of two series motors, B B' their fields, and C C' the compensating windings ordinarily used in alternating-current series motors. Since the compensating windings serve simply to improve the efficiency and power factor of the motors by neutralizing armature reaction and self-induction, and are not essential to my invention, I shall for the sake of convenience, omit further reference to the compensating windings. The two armatures are connected directly in series with each other, while the field windings B B' are connected in parallel with each other and in series with the armatures. This parallel connection of the fields is made for reasons which will hereinafter appear, but it has an additional and incidental advantage that may be noted in passing, since it makes it possible to obtain in a simple manner the stronger fields required for direct-current operation, simply by changing the fields from parallel to series in changing from alternating to direct-current operation. D represents the supply transformer. Either the primary or secondary winding may be variable as to the number of its turns, as is indicated by the movable contact *d*. One terminal of the armature circuit, that is, the upper terminal of compensating winding C, is connected to point 1 on the secondary winding of transformer D. The free terminals of field windings B and B' are connected to points 2 and 3, respectively, on the transformer winding. The common terminal of the two fields is connected to the armature circuit at 4. 5 represents the point of connection between the two armatures. E represents a transformer having a 1-to-2 ratio, the primary being connected between point 5, which is the point of connection between the two motor armatures, and point 6 on the secondary winding of the transformer D, while the secondary winding of transformer E is connected between point 4, the common terminal of the field windings, and point 7 on the secondary of transformer D, midway between points 2 and 3, to which the other terminals of windings B and B' are connected. The point 6 is so selected that it is half way between points 1 and 7. The effects of these connections are shown in Figs. 2 and 3, of which Fig. 2 shows the low-speed conditions, and Fig. 3 the high-speed conditions. In these figures line 1—2 represents in length and position the amount and phase of the secondary voltage of the supply transformer D. If both field windings B and B' were connected to point 7 on the supply transformer, the line 4—7 in Fig. 2 would represent the voltage-drop across the fields, and the line 1—4 the voltage-drop across the armatures in series, and the voltages at the armature terminals of the two motors would then be in phase. the angle 1—4—7 is shown as a right-angle, since the armature voltages are in phase with the field-current, which is approximately ninety degrees behind the voltage across the field terminals, as the field winding is highly inductive. Since the field windings B and B' are not connected to the same point on the supply-transformer, but are connected to the points 2 and 3, displaced from each other, the triangle 1—4—7 does not represent the actual conditions.

Owing to the displacement between the field connections, the voltages across the terminals of the two fields B and B' are represented by the lines 4—2 and 4—3, respectively, while the voltages across the armature terminals A and A' are represented by the lines 1—5 and 5—4, respectively; which lines are respectively perpendicular to the lines 4—2 and 4—3. The voltage across the primary terminals of transformer E is consequently represented by the line 5—6, while the voltage across the secondary terminals is represented by the line 4—7. The transformer E, as has already been said, has a ratio of 1 to 2, and the line 1—6 is equal to the line 6—7, so that if both field windings were connected to the point 7, and there were consequently no phase-displacement between the armature voltages, the primary and secondary voltages at the terminals of transformer E would be balanced, but owing to the phase-displacement of the armature voltages, as shown in Fig. 2, the voltage 5—6 across the primary terminals of transformer E is more than half the voltage 4—7 across its secondary terminals. Consequently, there is a flow of energy into the primary winding of the transformer and a delivery of energy from the secondary of the transformer E, which secondary is connected in shunt to the field windings B and B'. In other words, the transformer E supplies to the field windings B and B' a shunt excitation which depends in amount on the phase-displacement between the voltages at the terminals of the two armatures.

Fig. 2, as has been said, represents the low-speed conditions when the voltage-drop across the field windings is proportionately greater than at high speeds. Fig. 3 represents the high-speed conditions, in which the current, and consequently, the voltage-drop across the field windings is reduced, and the voltage across the armature terminals of the motors is increased. Since points 3 and 2 are fixed, a reduction in the length of the lines 4—3 and 4—2 increases the angle 3—4—2, and since the lines 1—5 and 5—4 remain perpendicular, respectively, to the lines 4—2 and 4—3, the angle 1—5—4 becomes smaller, or, in other words, the phase-displacement between the voltages at the armature terminals of the two motors increases. This means that the point of intersection 5 between lines 1—5 and 4—5 moves away from the line 1—4. The position of this point, and consequently the length of line 5—6, depends upon the phase relations of the voltages at the armature terminals of the two motors, and therefore upon the angle between the lines 3—4 and 2—4; while the length of the line 4—7 depends simply upon the drop in the field windings of the motors, and consequently upon the motor current. In Fig. 3 the line 5—6 is not only greater than one-half of the line 4—7, but is greater than the whole of the line 4—7, so that a comparatively great interchange of energy takes place between the windings of transformer E,—or, in other words, a comparatively strong shunt excitation is impressed on the field windings.

In order to make the diagrams of Figs. 2 and 3 clear, the voltage-drop across the field windings has been considerably exaggerated. In other words, the angle 4—1—2 has been shown greater than it would actually be in practice. This means that in practice the line 4—7, and consequently the line 5—6, would be more nearly perpendicular to 1—2 than appears in these figures. But even in these figures it will be seen that, at high speeds especially, these lines make an angle of nearly ninety degrees with the line 1—2, which represents the phase of the voltage impressed on the motor terminals. In other words, the shunt voltage impressed on the fields is nearly ninety degrees out of phase with the impressed motor voltage; so that the field-current due to this voltage, which lags ninety degrees behind it, is approximately in phase with the impressed motor voltage, which is the proper phase for the shunt field current in order that it may be effective in producing a counter-electromotive force in the armatures nearly in opposition to the impressed motor voltage.

In the above description no mention has been made of the drop across the compensating windings. Since the compensating windings are in inductive relation to the armatures, the voltage-drop across them is little greater than that due to the ohmic resistance, and is consequently negligible. For that reason the armature and compensating windings have been treated as a unit in the above discussion, and it will be understood that while in any efficient alternating-current series motor a compensating winding is necessary, the use of such a winding forms no part of my present invention.

What I claim as new, and desire to secure by Letters Patent of the United States, is,—

1. In combination with a plurality of alternating current motors each having its field and armature connected in series, connections for deriving from the motors a voltage displaced in phase nearly 90 degrees from the terminal voltage of the motors and increasing gradually and automatically as the motors speed up, and connections including means for impressing on the motor fields a shunt voltage corresponding in amount and phase to said derived voltage.

2. In combination with a plurality of alternating current series motors connected in series, connections for producing a phase-displacement between the voltages at the armature terminals of the motors, and connections including means for impressing on the motor fields a shunt voltage corresponding in amount to said phase-displacement.

3. In combination with a plurality of alternating-current series motors connected in series, connections for producing a phase-displacement between the voltages at the armature terminals of the motors gradually and automatically increasing with increase of speed, and connections including means for impressing on the motor fields a shunt voltage corresponding in amount to said phase-displacement.

4. In combination with a plurality of alternating-current series motors connected in series, a supply circuit therefor, connections for producing a phase-displacement between the voltages at the armature terminals of the motors, and connections including means for impressing on the motor fields a shunt voltage corresponding in amount to said phase-displacement and displaced in phase approximately ninety degrees from the voltage of the supply circuit.

5. In combination with a plurality of alternating-current series motors connected in series, a supply circuit therefor, connections for producing a phase-displacement between the voltages at their armature terminals gradually and automatically increasing with increase of speed, and connections including means for impressing on the motor fields a shunt voltage corresponding in amount to said phase-displacement and displaced in phase approximately ninety degrees from the voltage of the supply circuit.

6. In combination with a pair of alternating-current motors having their armatures in series and their fields in parallel with each other and in series with the armatures, a winding for supplying current to said motors, the free terminals of the fields being connected to points on said winding displaced from each other, and a transformer having its primary connected between the point of connection of the two armatures and a point on the supply-winding and its secondary in shunt to the field windings.

7. In combination with a pair of alternating-current motors having their armatures in series and their fields in parallel with each other and in series with the armatures, a winding for supplying current to said motors, the free terminals of the fields being connected to points on said winding displaced from each other, and a transformer having its primary connected between the point of connection of the two armatures and a point on the supply winding and its secondary connected between the common terminal of the fields and a point on said supply winding between the points to which the other field terminals are connected.

8. In combination with a pair of alternating-current series motors connected in series, a winding for supplying current thereto, connections for producing a phase-displacement between the voltages at the armature terminals of the two motors, and a transformer having its primary connected between the point of connection of the two motor armatures and a point on the supply-winding and its secondary in shunt to the motor fields.

In witness whereof, I have hereunto set my hand this 9th day of August, 1907.

ERNST F. W. ALEXANDERSON.

Witnesses:
BENJAMIN B. HULL,
HELEN ORFORD.